March 31, 1931.  C. H. HAPGOOD  1,798,258
WEIGHING SCALE
Filed Oct. 18, 1926   2 Sheets-Sheet 1
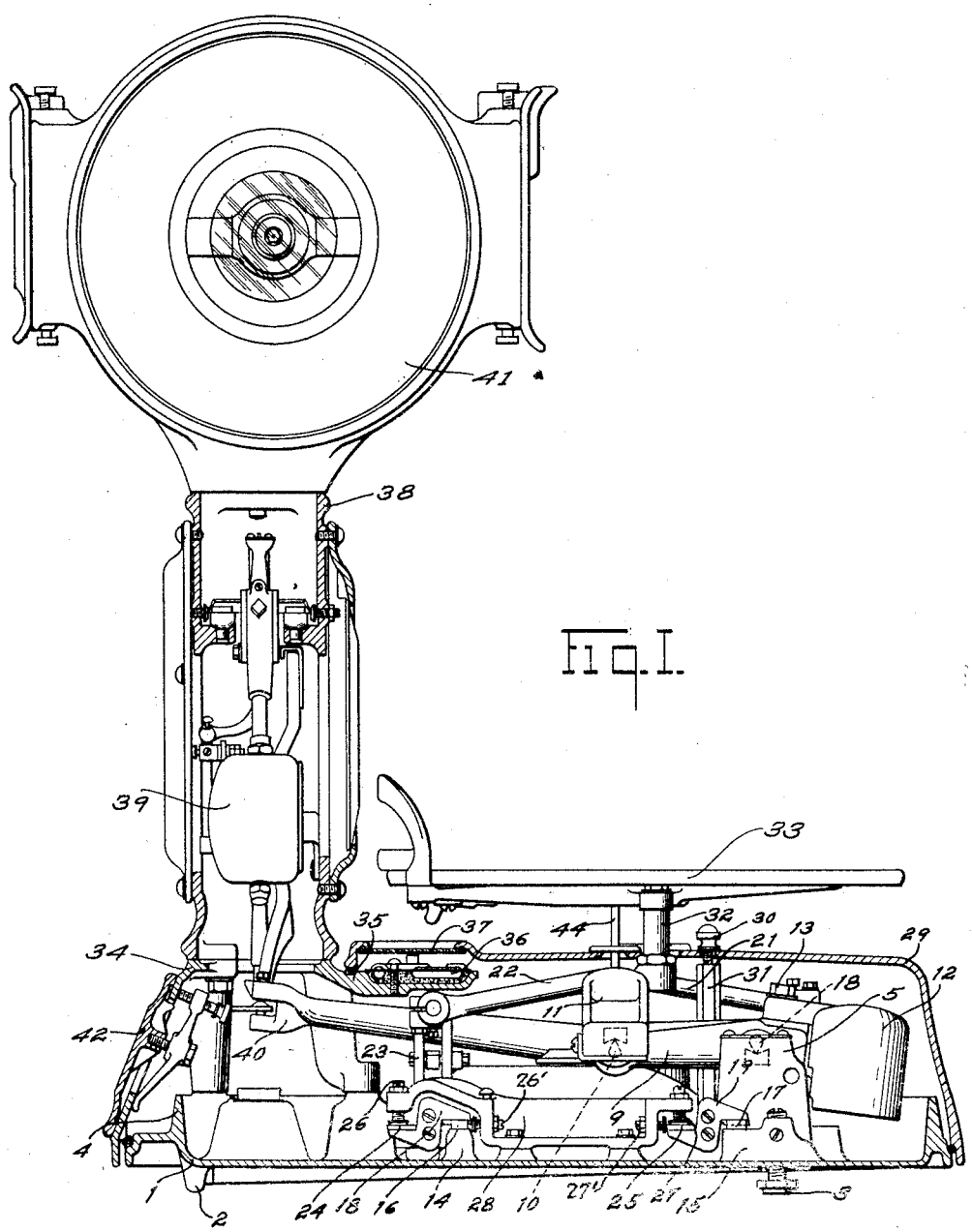
Fig. I.
Inventor
Clarence H. Hapgood
By C. M. Marshall
Attorney March 31, 1931.  C. H. HAPGOOD  1,798,258
WEIGHING SCALE
Filed Oct. 18, 1926   2 Sheets-Sheet 2
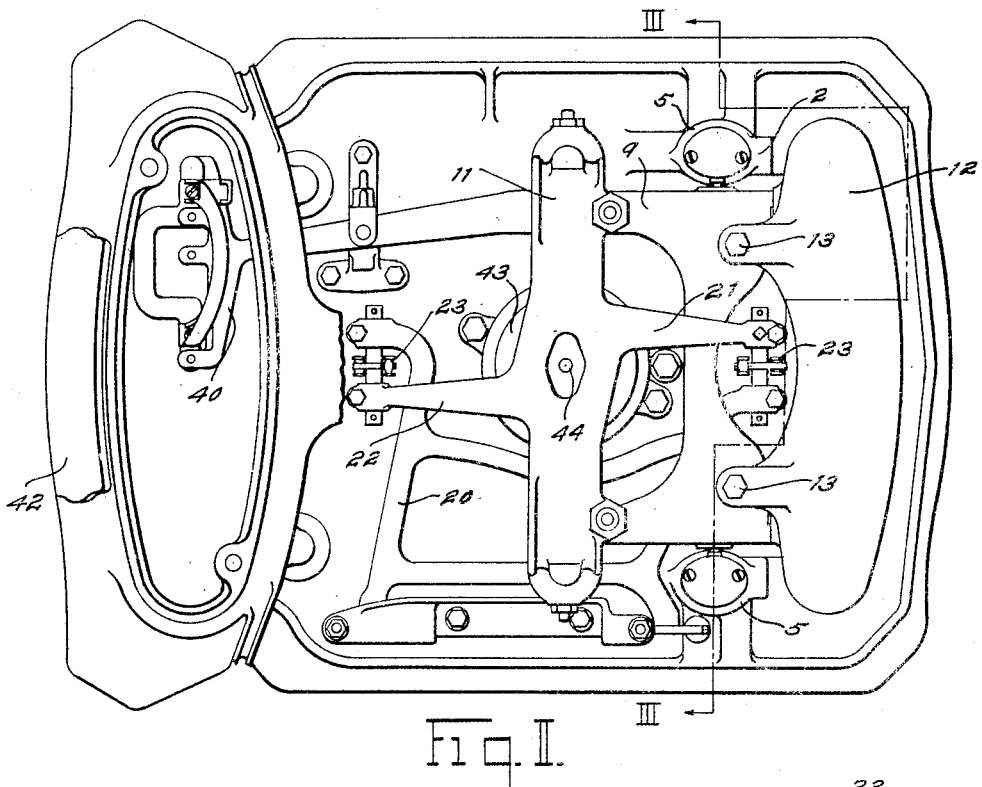
Fig. I.
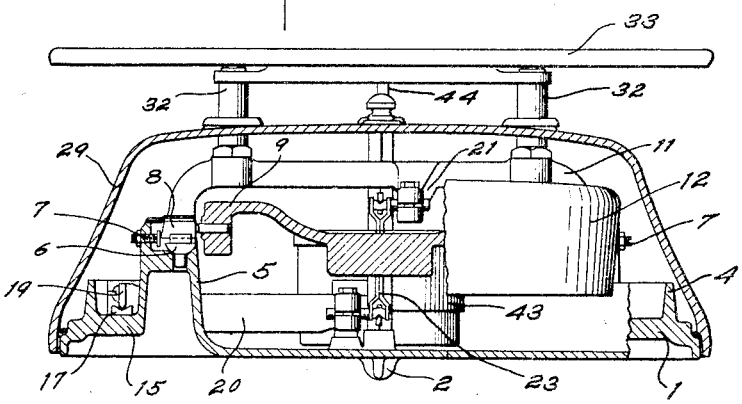
Fig. II.
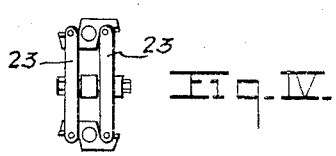
Fig. IV.
Inventor
Clarence H. Hapgood.
By C. O. Marshall
Attorney

UNITED STATES PATENT OFFICE

CLARENCE H. HAPGOOD, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed October 18, 1926. Serial No. 142,174.

This invention relates to weighing scales, and particularly to scales adapted to be used on counters of retail shops.

One of the principal objects of the invention is the production of platform lever mechanism adapted to support the platform at a relatively small elevation above the counter.

Another object is the provision of platform lever mechanism adapted to be enclosed in a low and compact base housing.

Another object is the provision of improved means to so support the platform at a low elevation above the counter that the accuracy of the indicated weight is substantially unaffected by the position of the load on the platform.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view, partly in section, showing a weighing scale of the cylinder type embodying my invention;

Figure II is a plan view of the base and platform lever mechanism of the scale, a housing support with a part broken away being shown as secured in place on the base;

Figure III is a front sectional view showing the base, platform lever mechanism and base cover, the platform lever mechanism being partly in section on substantially the line III—III of Figure II.

Figure IV is a detail view of the push-and-pull links.

Referring to the drawings in detail, the base 1 is supported at three points by means of a lug 2 and two adjustable leveling feet 3, only one of the latter being visible in the drawing. The base is provided with an upstanding flange 4 which increases its strength and rigidity. Formed upon the upper side of the base 1 is a pair of fulcrum stands 5 upon which are mounted supporting bearings 6 and adjustable thrust bearings 7 that engage knife edge pivots 8 which are fixed to the main platform lever 9 of the scale.

The platform lever is also provided with load pivots 10 which support a platform spider 11, the weight of the platform spider and part of the weight of the lever itself being counterbalanced by a weight 12 secured by means of bolts 13 to the lever on the side of the fulcrum pivots opposite from the platform spider 11.

Formed upon the top of the base 1 at one side thereof are bearing stands 14 and 15 which support V bearings 16 and 17. These bearings are engaged by knife edge pivots 18 and 19 which are secured to a frame 20. The platform spider 11 is provided with forwardly and rearwardly extending arms 21 and 22, from the ends of which depend push and pull link connections 23 particularly illustrated in Figure IV, the lower ends of these connections being pivoted to the frame 20 so that as the spider moves downwardly and upwardly during weighing operations the frame 20 is swung upwardly and downwardly also. In order to prevent the pivots 18 and 19 from rising out of their bearings 16 and 17 they are provided with upwardly extending edges 24 and 25 which engage the hardened flat heads of adjustable retaining screws 26 and 27 mounted on a bracket 28 which is secured to the base. In this way lateral shifting of the frame 20 is prevented, as the pivots 18 and 19 cannot change their positions when the screws 26 and 27 are properly adjusted to hold the pivots in the V-shaped grooves. Longitudinal shifting of the frame is obviated by the use of oppositely projecting thrust screws 26' and 27' engaging the inner ends of the pivots 18 and 19.

The lever mechanism so far described is enclosed by means of a base cover 29 held in place by a nut 30 which is threaded upon a stud in a post 31 extending upwardly from the base. The base cover 29 is provided with a pair of openings through which extend posts 32 upon the upper ends of which is mounted the commodity-receiving platform 33. When a load is placed upon the commodity-receiving platform directly over the load pivots 10 there is no tendency for the platform to tilt either forwardly or rearwardly. If the load be placed near the rear of the platform the platform tends to tilt rearwardly and the forwardly extending arm 21 of the spider tends to swing upwardly, thus pulling upwardly on the frame 20. As the frame 20 is pulled upwardly it creates an upward push on the links 23, thereby counteracting the tendency of the spider arm 22 to swing downwardly. The horizontal position of the platform is thus maintained. The mechanism similarly acts to maintain the horizontal position of the platform when the load is placed near its forward edge and the parts are so adjusted that the pressure on the load pivots for a given load is the same regardless of the position of the load on the platform.

Secured upon the base at its rear end is a housing support 34, the joints between the housing support and the base, the housing support and the base cover, and the base cover and the base being made tight by means of suitable gaskets. A portion 35 of the housing support extends under the rear end of the base cover and carries a level 36 which is visible through a window 37 in the base cover.

Surmounting the housing support 34 is an upright housing 38 within which is mounted automatic load-counterbalancing mechanism consisting of a pendulum 39 connected in the well known manner to the nose 40 of the main lever 9, and surmounting the housing 38 is a casing 41 which contains the usual cylindrical computing chart. The load-counterbalancing and indicating mechanisms of the scale, being of well known form, are not illustrated in detail or particularly described in this application.

Access to the nose of the lever may be had by removal of a cover plate 42 from the housing support 34. The vibration of the mechanism is controlled by means of a dash pot 43 from which a plunger rod 44 extends upwardly through the base cover 29 to a pivotal connection with the platform 33.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a lever having load pivots, a commodity-receiver supported on said load pivots, means for maintaining said commodity-receiver in horizontal position during weighing movements of said lever, consisting of a frame mounted on knife edge pivots having axes at an angle to the axis of said load pivots, and means for holding the knife edge pivots of said frame in operative engagement with their bearings.

2. In a device of the class described, in combination, a base, lever mechanism supported thereon, a post on said base, a base cover enclosing said lever mechanism, and means for securing said base cover to said post.

3. In a device of the class described, in combination, a base, a level supported thereby, and a base cover secured to said base, said base cover having a window thereon, said level being viewable through said window.

4. In a device of the class described, in combination, weighing mechanism comprising a lever, a commodity-receiver supported on said lever, means for maintaining said commodity-receiver in horizontal position during weighing movements of said lever consisting of a frame mounted upon knife edge pivots, and means for preventing relative lateral and longitudinal movement of said frame.

5. In a device of the class described, in combination, weighing mechanism comprising a lever, a platform supporting spider pivotally supported upon said lever and having laterally projecting arms, knife edge members adjustably carried by said arms, a pivotally mounted frame having axes at right angles to the pivotal axis of the platform spider, and means including a plurality of links for joining the knife edge members to said frame.

CLARENCE H. HAPGOOD.